(12) United States Patent
Anand et al.

(10) Patent No.: US 7,707,455 B2
(45) Date of Patent: Apr. 27, 2010

(54) SELF-SERVICE RECOVERY OF APPLICATION DATA

(75) Inventors: Karandeep Singh Anand, Kirkland, WA (US); Vijay Sen, Hyderabad (IN)

(73) Assignee: Microsoft Corporation, Redmond, WA (US)

( * ) Notice: Subject to any disclaimer, the term of this patent is extended or adjusted under 35 U.S.C. 154(b) by 519 days.

(21) Appl. No.: 11/686,184

(22) Filed: Mar. 14, 2007

(65) Prior Publication Data

US 2008/0229142 A1 Sep. 18, 2008

(51) Int. Cl.
*G06F 11/00* (2006.01)

(52) U.S. Cl. .............................. 714/6; 714/4; 711/161; 711/162

(58) Field of Classification Search .................... 714/4, 714/6
See application file for complete search history.

(56) References Cited

U.S. PATENT DOCUMENTS

| | | | |
|---|---|---|---|
| 5,930,824 A | 7/1999 | Anglin et al. | |
| 6,065,017 A | 5/2000 | Barker | |
| 7,069,277 B2 | 6/2006 | Okada et al. | |
| 2004/0010487 A1 | 1/2004 | Prahlad et al. | |
| 2004/0221203 A1* | 11/2004 | Ruhlen et al. | 714/38 |
| 2004/0235523 A1* | 11/2004 | Schrire et al. | 455/558 |
| 2004/0249865 A1 | 12/2004 | Lee et al. | |
| 2006/0149997 A1 | 7/2006 | Chai et al. | |
| 2006/0190505 A1 | 8/2006 | DeMaio et al. | |
| 2006/0242211 A1 | 10/2006 | Becker et al. | |
| 2007/0005914 A1 | 1/2007 | Thompson et al. | |
| 2008/0229142 A1* | 9/2008 | Anand et al. | 714/4 |

FOREIGN PATENT DOCUMENTS

WO 2004099993 A1 11/2004

OTHER PUBLICATIONS

Unknown, "Oracle7Server Concepts Manual," 1996, 16 pages, Oracle Corporation, USA.
Bednar et al., "Flashback Technology: Recovering from Human Errors," An Oracle White Paper, Nov. 2003, 13 pages, Oracle Corporation, USA.
Unknown, "Data Sheet—Recovery Management for DB2," 2005, 8 pages, BMC Software, Inc. USA.
Unknown, "Data & System Protection," 1995, 2 pages, Symantec Corporation, USA.
Unknown, "Products: Galaxy Backup & Recovery," 2 pages, 2007, CommVault, USA.

* cited by examiner

*Primary Examiner*—Emerson C Puente
(74) *Attorney, Agent, or Firm*—Senniger Powers LLP

(57) ABSTRACT

Self-service recovery of application data. A list of recoverable objects for the application is generated in response to the receipt of a request for an application recovery from a user. The list of recoverable objects for the application is sent to the user. A selected recoverable object from the user is received. In response, the execution of a recovery job on the backup and restore application is initiated for the selected recoverable object.

18 Claims, 3 Drawing Sheets

US 7,707,455 B2

SELF-SERVICE RECOVERY OF APPLICATION DATA

BACKGROUND

With the increased specialization of roles and workloads in organizations, there are more and more instances of application owners being different than the backup and recovery owners. In these situations, it becomes increasingly difficult to coordinate between the application owners and the backup owners to define and meet the organization's data protection and recovery SLAs (Service Level Agreements).

Application owners often invest in and manage their own backup systems with little or no coordination with the backup team in their organization. In turn, the complexity, cost and points of failure of an organization wide protection SLAs are increased. For example, a large number of database administrators perform their own backups and expect the backup team to back up these files using the enterprise backup tools.

SUMMARY

Embodiments of the invention overcome one or more disadvantages of the lack of coordination between application owners and backup owners by allowing application owners to self-recover application data.

Aspects of the invention include receiving a request for an application recovery from user and generating a list of recoverable objects for the application. A selected recoverable object from the list of recoverable objects is received from the user. The execution of a recovery job on the backup and restore application is initiated to recover the selected recoverable object. As such, aspects of the invention allow the user to recover a recoverable object for the application without requiring them to learn the backup and restore application.

Aspects of the invention also include receiving recovery job progress data for the selected recoverable object from the recovery job, translating it into application recovery progress data and sending the application recovery job progress data to the user.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWING

Corresponding reference characters indicate corresponding parts throughout the drawings.

DETAILED DESCRIPTION

Figure 1:
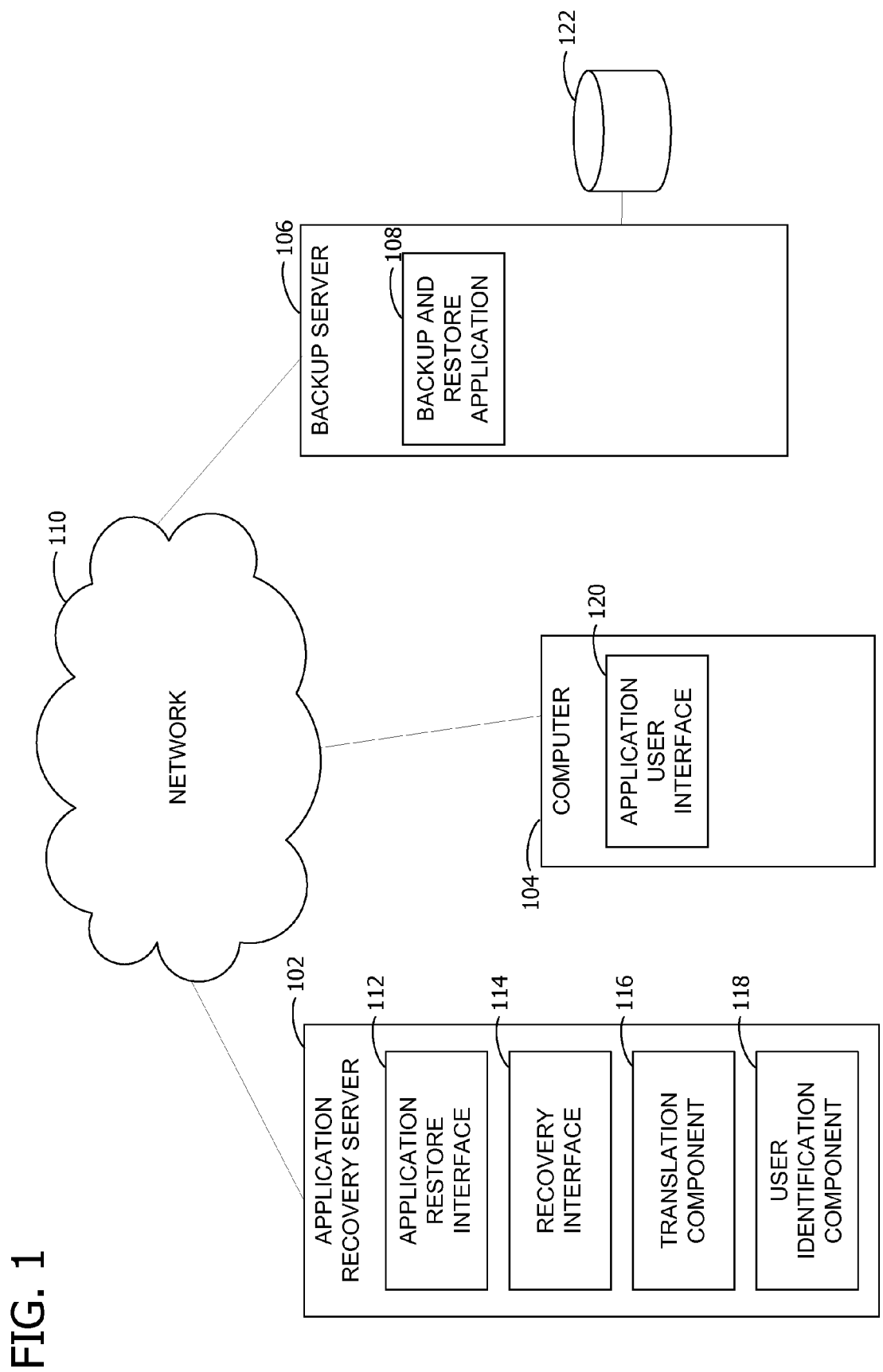
FIG. 1 is a block diagram illustrating one example of a suitable computing system environment in which the invention may be implemented.

FIG. 1 is a block diagram illustrating one example of a suitable computing system environment in which the invention may be implemented. An application recovery server 102 acts an intermediary between a client computer 104 requesting an application recovery and a backup server 106 that includes a backup and restore application 108. The client computer 104, application recovery server 102 and the backup server 106 communicate via a network 110. In an embodiment, the application recovery server 102 can coexist as a separate process on an application server of an application.

The application recovery server 102, client computer 104 and backup server 106 may operate in a networked environment using logical connections. The logical connections depicted in FIG. 1 include a local area network (LAN) and a wide area network (WAN), but may also include other networks. LAN and/or WAN may be a wired network, a wireless network, a combination thereof, and so on. Such networking environments are commonplace in offices, enterprise-wide computer networks, intranets, and global computer networks (e.g., the Internet). The network connections shown are exemplary and other means of establishing a communications link between the computers may be used.

The application recovery server 102 includes one or more computer-readable medium with instructions for an application restore interface 112, a recovery interface 114 and a translation component 116. Alternatively, the application recovery server 102 may also include one or more computer-readable mediums with instructions for a user identification component 118. In an embodiment, the user identification component 118 authenticates the user and determines a recovery scope for the user. The recovery scope identifies the recoverable objects that the authenticated user is authorized to access. In an embodiment, the identity of the user (e.g., an application administrator) requesting the application recovery is translated into permissions understood by the backup and restore application 108. For example, the user may authenticated by a username and password, a token based authentication leveraging Kerberos and the like.

The application restore interface 112 receives a request for an application recovery from a user. In an embodiment, the user is an application administrator. In another embodiment, the user accesses the application restore interface 112 via an application user interface 120 executing on the client computer 104. The application restore interface 112 sends a list of recoverable objects for the application to the user. The list of recoverable objects is generated by the recovery interface 114. The application restore interface 112 also receives a selected recoverable object from list of recoverable objects from the user and sends application recovery job progress data to the user.

The recovery interface 114 generates a list of recoverable objects for the application. In an alternative embodiment, the list of recovery objects includes the versions of a recoverable object. The recovery interface 114 may include all available versions of the recoverable object in the list and is not limited to simple file versions of the recoverable object. For example, the versions of a recoverable object may include versions of the object in a full backup of a database and all incremental log backups, versions of the object in shadow copies available on the backup server 106, versions of the object in snapshots available on the backup server 106, versions of the object in a recovery catalog of the backup system (e.g., tape backups, backups on a retention server) and the like.

Additionally, the recovery interface 114 initiates the execution of a recovery job in the backup and restore application 108 to restore the selected recoverable object. For example, the recovery interface 114 initiates the execution of a recovery job on the backup and restore application 108 by generating a recovery job script for execution on the backup and restore application 108 to restore the selected recoverable object, scheduling multiple recovery jobs for execution on the backup and restore application 108 to restore the selected recoverable object, executing a post-restore task and the like. In an embodiment, the backup and restore application 108 on the backup server 106 and the recoverable objects are stored on a storage device 122 of the backup server 106.

The backup server 106, backup and restore application 108, and storage device 122 shown in FIG. 1 are shown as single entities for convenience only. It is understood by those skilled in the art that the backup server 106 may comprise a plurality of backup servers, each executing one or more backup and restore applications. Also, the store device 122 includes, but is not limited to, a hard disk drive, a magnetic disk drive, optical disk, magnetic tape cassettes, flash memory cards, digital versatile disks, digital video tape, solid state RAM, solid state ROM, and the like.

The recovery interface 114 receives recovery job progress data from the recovery job of the backup and restore application 108. The execution of the recovery job by the backup and restore application 108 of the backup server 106 generates the recovery job progress data. In an embodiment, the recovery interface 114 receives the recovery job progress data from the backup and restore application 108 by receiving output from the executing recovery job, subscribing to success/failure events generated by the recovery job, consuming events from system monitoring tools generated by the recovery job and the like.

The translation component 116 maps the application namespace of the selected recoverable object to a recovery application namespace of the recovery job. Additionally, in an embodiment, the translation component 116 converts the recovery job progress data from the recovery job to application recovery job progress data.

The user identification component 118 authenticates the user and determines a recovery scope for the user. The recovery scope identifies the recoverable objects that the authenticated user is authorized to access. In an embodiment, the identity of the user (e.g., an application administrator) requesting the application recovery is translated into permissions understood by the backup and restore application 108. For example, the user may authenticated by a username and password, a token based authentication leveraging Kerberos and the like. The user identification component 118 defines the recovery scope for the authenticated users. In another embodiment, the user identification component 118 communicates with a central entity to determine the recovery scope. For example, an organization could choose to have a central store that holds permissions for different users and groups and the user identification component 118 accesses the central store and determines the recovery scope.

In an embodiment, recovery scope is defined as a table comprising a list of resources (e.g. databases, Collaboration sites, and E-mail storage groups), list of users and the permissions of the user (e.g., read-only, recover to original location, recover to alternate location). An example of a recovery scope table according to an embodiment of the invention is shown below in Table 1.

TABLE 1

| Resource Name | Resource Identifier | User Identifier | Permissions |
|---|---|---|---|
| Server 1\ Database 1 | <GUID1> | DOMAIN\ Username1 | Read Recover to Alternate Location |

TABLE 1-continued

| Resource Name | Resource Identifier | User Identifier | Permissions |
|---|---|---|---|
| collaboration Server 1\Site 2 | <GUID2> | DOMAIN\ Username 2 | Read Recover to Original Location |
| ... | | | |
| Server N\Data Source n | <GUIDn> | DOMAIN\ Username N | <Permission Set> |

The recovery scope table enables the lookup of the permissions of the user requesting the application recovery with the list of permitted restore actions. For example, Admin A might have access to Database A while Admin B may have access to Database B on the same server. The list of recoverable objects may be constructed as a function of the recovery scope table.

In an alternative embodiment, the list of recoverable objects generated by the recovery interface 114 includes a namespace for each object and the translation component 116 maps a recovery job namespace to an application namespace for the recoverable objects. Additionally, the translation component 116 maps the application namespace for selected recoverable object to a recovery job namespace. The recovery job namespace is included in the recovery job executed by the backup and restore application 108 of the backup server 106. Moreover, the recovery job namespace included in the data recovery job progress data received by the recovery interface 114 is mapped to the application namespace of the selected recovery object. The mapped application namespace is included in the translated application recovery job progress data sent to the user by the application restore interface 112.

In one embodiment of the invention, a computer such as application recovery server 102, client computer 104 and backup server 106 is suitable for use in the other figures illustrated and described herein. Computer (e.g., application recovery server 102, client computer 104 and backup server 106) has one or more processors or processing units and a system memory. The computer (e.g., application recovery server 102, client computer 104 and backup server 106) typically has at least some form of computer readable media. Computer readable media, which include both volatile and nonvolatile media, removable and non-removable media, may be any available medium that may be accessed by computer (e.g., application recovery server 102, client computer 104 and backup server 106). By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer (e.g., application recovery server 102, client computer 104 and backup server 106).

Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

Figure 2:
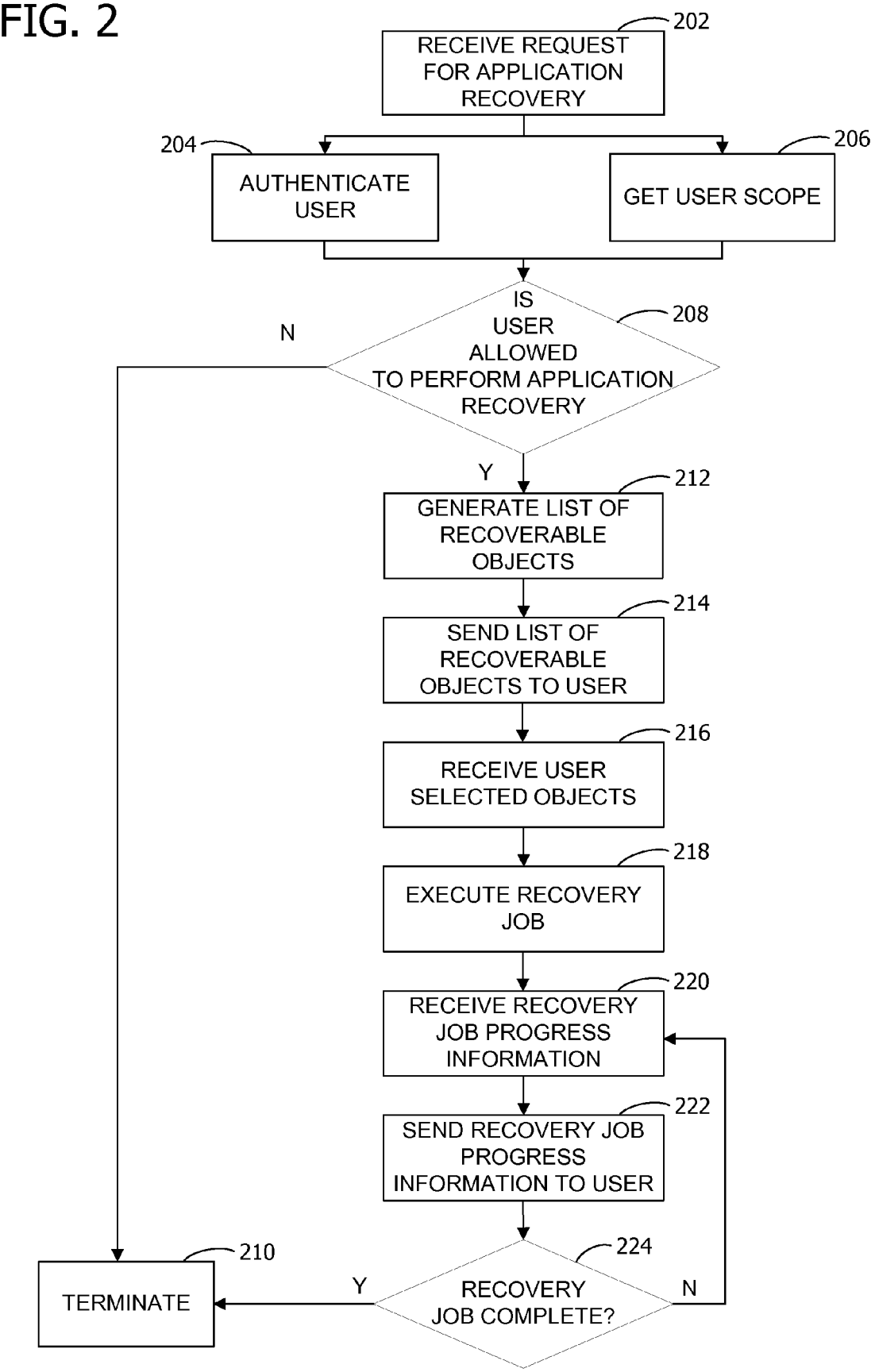
FIG. 2 is an exemplary flow diagram illustrating an embodiment of self-service recovery of application data.

Referring now to FIG. 2, a flow diagram for an embodiment of a self-service recovery of application data is shown. At 202, the application recovery server 102 receives a request for an application recovery from a user. In an embodiment, the user is an application administrator.

In another embodiment, at 204, the application recovery server 102 authenticates the user. For example, the user may authenticated by a username and password, a token based authentication leveraging Kerberos and the like. And at 208, the application recovery server 102 determines if the authenticated user is allowed to perform application recovery. If the user is not allowed, the application terminates at 210.

If the user is allowed to perform application recovery, at 212, the application recovery server 102 generates a list of recoverable objects for the application. In an embodiment, the list of recoverable objects are objects accessible to the authenticated user.

At 214, the application recovery server 102 sends the list of recoverable objects for the application to the user. In an alternative embodiment, the list of recoverable objects includes the available versions for each object. The versions of the recoverable objects include versions of the object in a full backup of a database and all incremental log backups of the database, versions of the object in shadow copies available on the backup server 106, versions of the object in snapshots available on the backup server 106, versions of the object in a recovery catalog of the backup system, and the like.

At 216, the application recovery server 102 receives a selected recoverable object from the user and at 218, the application recovery server 102 initiates the execution of a recovery job in the backup and restore application 108 for the selected recoverable object. The recovery job attempts to restore the selected recoverable object via the backup and restore application 108. In an embodiment, the initiating the execution of a recovery job in the backup and restore application 108 includes generating a single recovery job script for execution on the backup and restore application 108 to restore the selected recoverable object, scheduling multiple recovery jobs for execution on the backup and restore application 108 to restore the selected recoverable object, executing a post-restore task, and the like. For example, post-restore tasks may include running a consistency check on a restored database and mounting a restored database.

In another example, suppose the administrator backs up a web server. To achieve this, the administrator uses a command provided by the web server application to dump the backup data to a file. Then, the dump file is backed up using the backup and restore application 108. Now, to recover the web server, the dump file is restored by the backup and restore application 108 and then the web server is restored using a command provided by the web server to restore web server to complete the recovery. In this case, the execution of command provided by the web server to restore web server from the recovered dump file is the post-restore task.

At 220, the application recovery server 102 receives recovery job progress data for the selected recoverable object from the recovery job. In an embodiment, the recovery job progress data from the backup and restore application 108 includes receiving output from the executing recovery job, subscribing to success/failure events generated by the recovery job, consuming events from system monitoring tools generated by the recovery job, and the like.

At 222, the application recovery server 102 sends application recovery job progress data to the user. The application recovery server 102 translates the received data recovery job progress data into application recovery job progress data. For example, a line-of-business (LOB) application is a set of critical computer applications that are vital to running an enterprise, such as accounting, supply chain management, and resource planning applications. LOB applications are usually large programs that contain a number of integrated capabilities that are tied into websites, databases and database management systems. The LOB application translates into multiple recovery jobs of the underlying components (e.g., recovery of the database, recovery of the web site, recovery of files of the application). The progress of these individual recovery jobs can then be mapped to the overall progress of the recovery of the application (e.g. 25% progress on recovery of the database, 15% progress on the recovery of the web site, 50% progress on recovery of the files and 100% recovery when the entire application is recovered).

At 224, the application recovery server 102 determines if the recovery job has completed as a function of the recovery job progress information. If so, the program terminates at 210. If not, the application recovery server 102 continues to monitor the backup server 106 for recovery job progress data at 220.

In an alternative embodiment, the list of recoverable objects generated at step 212 includes a namespace for each object and the application recovery server 102 maps a recovery job namespace to an application namespace for the recoverable objects. In this embodiment, the application recovery server 102 maps the application namespace for selected recoverable object to a recovery job namespace. The recovery job namespace is included in the executed recovery job. Moreover, the recovery job namespace included in the recovery job progress data received at step 220 is mapped to the application namespace of the selected recovery object. The mapped application namespace is included in the translated application recovery job progress data sent to the user at step 222.

Figure 3:
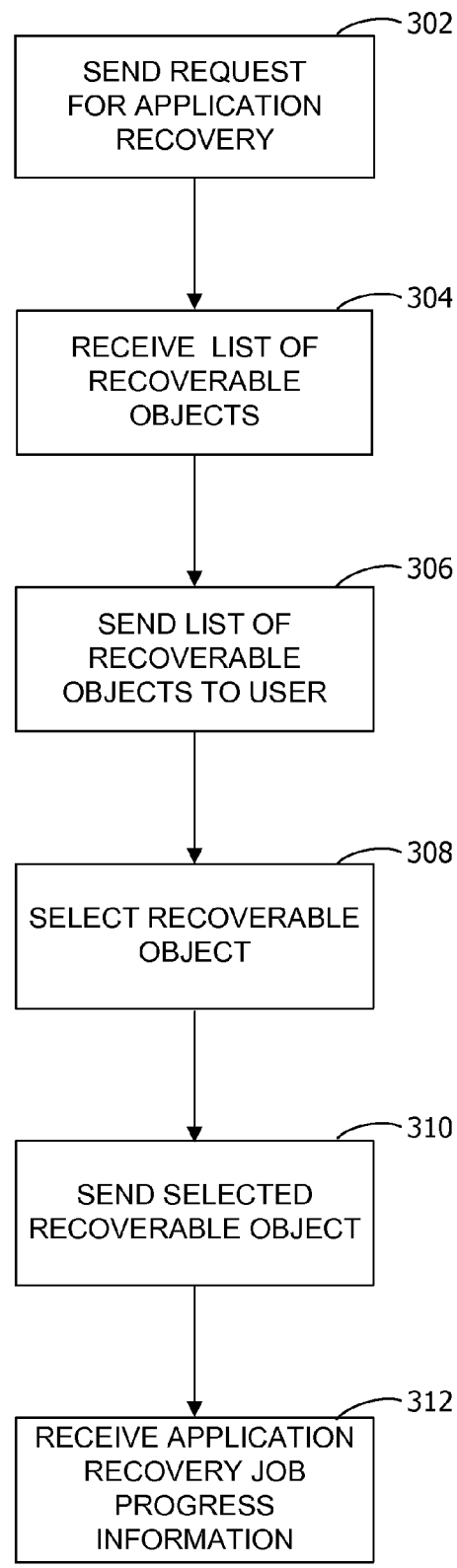
FIG. 3 illustrates a flow diagram for an embodiment of the self-service recovery of application data.

FIG. 3 illustrates a flow diagram for an embodiment of a self-service recovery of application data. At 302, an application administrator sends a request for an application recovery to the application recovery server 102. Advantageously, the application administrator has control over the application data and may recover the application data without requiring knowledge of the underlying the backup and restore application 108.

At 304, the application administrator receives a list of recoverable objects for the application from the application recovery server 102. The application recovery server 102 generates the list of recoverable objects in response to receiving the request from the application administrator. In an embodiment, the list of recoverable objects includes the available versions for each object. The version of a recoverable objects may includes versions of the object in a full backup of a database and all incremental log backups, versions of the object in shadow copies available on the backup server 106, versions of the object in snapshots available on the backup server 106, versions of the object in a recovery catalog of the backup system and the like.

At 306, the application administrator selects a recoverable object from the received list of recoverable objects and at 308, the application administrator sends the selected recoverable object to the application recovery server 102. In response, the application recovery server 102 initiates a recovery job on a backup and recovery server to retrieve the selected object. Advantageously, the application administrator may initiate the recovery job without the involvement of the backup administrators and without knowledge of underlying backup systems of the backup server 106.

At 310, the application administrator receives application recovery job progress data for the selected recoverable object from the application recovery server 102. The application recovery server 102 generates the application recovery job progress data in response to receiving recovery job progress data from the recovery job initiated on the backup and recovery server. For example, the recovery job progress data from the backup and restore application 108 includes output from the executing recovery job, success/failure events generated by the recovery job, events from system monitoring tools generated by the recovery job and the like.

In an alternative embodiment, the request includes identification information for the application administrator and the application recovery server 102 authenticates the application administrator as a function of the identification information of the request. In this embodiment, the application server generates the list of recoverable objects that are accessible to the authenticated application administrator.

In another alternative embodiment, the list of recoverable objects received at step 304 includes an application namespace for each object in the list. The recovery server maps a recovery job namespace to an application namespace for the selected recoverable objects and includes the recovery job namespace in the executed recovery job. Moreover, the application server maps the recovery job namespace included in the recovery job progress data to the application namespace of the selected recovery object included in the application recovery job progress data received at step 310.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

In operation, computer (e.g., application recovery server 102, client computer 104 and backup server 106) executes computer-executable instructions such as those illustrated in the figures to implement aspects of the invention.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A method for self-service recovery of application data, comprising:
   receiving a request for recovery of a Line of Business (LOB) application from a user;
   authenticating the user;
   translating, via a computer, the received request as a function of a recovery scope table into a plurality of recoverable objects corresponding to the LOB application in response to the receipt of the request, wherein the plurality of recoverable objects are deemed accessible to the authenticated user;
   initiating execution of a recovery job on a backup and restore application for the plurality of recoverable objects, said recovery job attempting to restore the plurality of recoverable objects;
   receiving recovery job progress data for the plurality of recoverable objects from the recovery job of the backup and restore application, said receiving further comprising consuming events generated by the recovery job via system monitoring tools; and
   sending application recovery job progress data to the user, said application recovery job progress data translated from the received recovery job progress data, said translating comprising mapping progress of recovery of each recoverable object to overall progress of the recovery of the LOB application.

2. The method of claim 1, wherein the user is an application administrator.

3. The method of claim 1, wherein the list of recoverable objects includes one or more available versions for each object.

4. The method of claim 3, wherein the version of a recoverable objects includes at least one of the following: versions of the object in a full backup of a database and all incremental log backups; versions of the object in shadow copies available on a backup server; versions of the object in snapshots available on a backup server and versions of the object in a recovery catalog of the backup system.

5. The method of claim 1, wherein generating the list of recoverable objects for the application further comprises mapping a recovery job namespace to an application namespace for the recoverable objects.

6. The method of claim 1, wherein initiating the execution of a recovery job further comprises mapping an application namespace for selected recoverable object to a recovery job namespace.

7. The method of claim 1, wherein the initiating the execution of a recovery job on the backup and restore application includes one or more of the following:
generating a single recovery job script for execution on the backup and restore application to restore the selected recoverable object; scheduling multiple recovery jobs for execution on the backup and restore application to restore the selected recoverable object; and executing a post-restore task.

8. The method of claim 1, wherein receiving the recovery job progress data from the backup and restore application further includes one or more of the following: receiving output from the executing recovery job; and subscribing to success/failure events generated by the recovery job.

9. A system for self-service recovery of application data, comprising:
a memory area for storing computer executable components of:
an application restore interface for:
receiving a request for recovery of an application from a user;
sending a list of recoverable objects for the application to the user;
receiving a selected recoverable objects from list of recoverable objects from the user; and
sending application recovery job progress data to the user;
a user identification component for:
authenticating the user;
determining a recovery scope for the user identifying the recoverable objects that the authenticated user may access as a function of a recovery scope table, said recovery scope table comprising a specification of a) a list of recoverable objects, b) a list of users and c) a list of permissions of each user of the list of users;
a recovery interface for:
generating a list of recoverable objects for the application within the recovery scope of the authenticated user in response to the received request;
initiating execution of a recovery job of the backup and restore application to restore the selected recoverable object; and
receiving a recovery job progress data from the recovery job of a backup and restore application, said recovery job progress data generated in response to the execution of the recovery job, said receiving including consuming events generated by the recovery job via system monitoring tools;
a translation component for:
mapping the application namespace of the selected recoverable object to a recovery application namespace of the recovery job; and
translating the recovery job progress data from the recovery job to application recovery job progress data, wherein the application recovery job progress data is sent to the user by the application restore interface, and a processor for executing said stored computer-executable components.

10. The system of claim 9, wherein the user is an application administrator.

11. The system of claim 9, wherein the list of recoverable objects includes one or more available versions for each object.

12. The system of claim 11, wherein the version of a recoverable objects includes at least one of the following: versions of the object in a full backup of a database and all incremental log backups; versions of the object in shadow copies available on a backup server; versions of the object in snapshots available on a backup server and versions of the object in a recovery catalog of the backup system.

13. The system of claim 9, wherein the initiating the execution of a recovery job on the backup and restore application includes one or more of the following: generating a single recovery job script for execution on the backup and restore application to restore the selected recoverable object; scheduling multiple recovery jobs for execution on the backup and restore application to restore the selected recoverable object; executing a post-restore task.

14. The system of claim 9, wherein receiving the recovery job progress data from the backup and restore application includes one or more of the following: receiving output from the executing recovery job; and subscribing to success/failure events generated by the recovery job.

15. A method for self-service recovery of application data by an application administrator, comprising:
authenticating the application administrator;
sending a request for recovery of an application to an application recovery server, said request comprising identification information of the authenticated application administrator;
receiving a list of recoverable objects for the application from the application recovery server, wherein the application recovery server generates the list of recoverable objects in response to receiving the request and as a function of the identification information, said list of recoverable objects generated based on a recovery scope table of the application recovery server;
selecting a recoverable object from the received list of recoverable objects;
sending the selected recoverable object to the application recovery server, wherein the application recovery server initiates a recovery job on a backup and recovery server to retrieve the selected object; and
receiving application recovery job progress data for the selected recoverable object from the application recovery server, wherein the application recovery server generates the application recovery job progress data in response to receiving recovery job progress data from the recovery job initiated on the backup and recovery server, said received recovery job progress data comprising events generated by the recovery job via system monitoring tools.

16. The method of claim 15, wherein the list of recoverable objects includes one or more available versions for each object.

17. The method of claim 16, wherein the version of a recoverable objects includes at least one of the following: versions of the object in a full backup of a database and all incremental log backups; versions of the object in shadow copies available on a backup server; versions of the object in snapshots available on a backup server and versions of the object in a recovery catalog of the backup system.

18. The method of claim 15, wherein the recovery job progress data from the backup and restore application additionally includes one or more of the following: output from the executing recovery job; and success/failure events generated by the recovery job.

* * * * *